(12) United States Patent
Serita et al.

(10) Patent No.: US 11,312,430 B2
(45) Date of Patent: Apr. 26, 2022

(54) METHOD AND SYSTEM FOR LEAN ANGLE ESTIMATION OF MOTORCYCLES

(71) Applicant: Hitachi, Ltd., Tokyo (JP)

(72) Inventors: Susumu Serita, San Jose, CA (US); Chetan Gupta, San Mateo, CA (US)

(73) Assignee: Hitachi, Ltd., Tokyo (JP)

( * ) Notice: Subject to any disclaimer, the term of this patent is extended or adjusted under 35 U.S.C. 154(b) by 380 days.

(21) Appl. No.: 16/332,210

(22) PCT Filed: Aug. 7, 2017

(86) PCT No.: PCT/US2017/045807
§ 371 (c)(1),
(2) Date: Mar. 11, 2019

(87) PCT Pub. No.: WO2019/032092
PCT Pub. Date: Feb. 14, 2019

(65) Prior Publication Data
US 2019/0271543 A1 Sep. 5, 2019

(51) Int. Cl.
| | |
|---|---|
| *B62D 37/06* | (2006.01) |
| *G01B 21/22* | (2006.01) |
| *B60L 15/10* | (2006.01) |
| *B60L 15/20* | (2006.01) |
| *B62J 45/415* | (2020.01) |

(Continued)

(52) U.S. Cl.
CPC .............. *B62D 37/06* (2013.01); *B60L 15/10* (2013.01); *B60L 15/20* (2013.01); *B62J 45/4151* (2020.02); *G01B 21/22* (2013.01); *B60L 2200/12* (2013.01); *B60L 2240/18* (2013.01); *B60L 2240/622* (2013.01); *B60L 2260/34* (2013.01); *B62J 45/41* (2020.02); *B62J 50/21* (2020.02)

(58) Field of Classification Search
CPC ......... G01B 21/22; B60L 15/10; B60L 15/20; B60L 2240/18; B60L 2240/622; B60L 2260/34; B62J 45/40; B62J 45/20; B62J 99/00; B62J 45/4151; B62D 37/06
See application file for complete search history.

(56) References Cited

U.S. PATENT DOCUMENTS

| | | | |
|---|---|---|---|
| 5,487,006 A | 1/1996 | Kakizaki et al. | |
| 2010/0168958 A1* | 7/2010 | Baino | B60Q 1/12 701/36 |

(Continued)

FOREIGN PATENT DOCUMENTS

EP 3335953 B1 * 11/2019 ............ B60W 30/02

OTHER PUBLICATIONS

International Search Report and Written Opinion for related International Application No. PCT/JP2017/045807, dated Oct. 23, 2017; 6 pages.

*Primary Examiner* — Hussein Elchanti
(74) *Attorney, Agent, or Firm* — Procopio, Cory, Hargreaves & Savitch LLP

(57) ABSTRACT

Example implementations described herein are directed to a system for lean angle estimation without requiring specialized calibration. In example implementations, the mobile device sensor data can be utilized without any additional specialized data or configuration to estimate the lean angle of a motorcycle. The lean angle is determined based on a determination of a base attitude of a mobile device and a measured attitude of the mobile device.

13 Claims, 9 Drawing Sheets

(51) Int. Cl.
   *B62J 50/21*    (2020.01)
   *B62J 45/41*    (2020.01)

(56) References Cited

U.S. PATENT DOCUMENTS

| | | | |
|---|---|---|---|
| 2012/0295552 A1* | 11/2012 | Senoo | A63B 24/0021 455/73 |
| 2013/0346047 A1* | 12/2013 | Fukushige | G06F 30/15 703/8 |
| 2016/0061627 A1* | 3/2016 | Tan | G01C 25/00 702/85 |
| 2016/0325739 A1 | 11/2016 | Litz et al. | |

* cited by examiner

| time | longitude | latitude | altitude |
|---|---|---|---|
| 1478217990 | 121.989 | 54.351 | 4.142 |
| 1478217991 | 121.988 | 54.352 | 4.142 |
| 1478217992 | 121.987 | 54.353 | 4.143 |
| ... | ... | ... | ... |

FIG. 2

| time | acceleration_x | acceleration_y | acceleration_z |
|---|---|---|---|
| 1478217990 | 0.010687 | 0.01974 | -0.0691 |
| 1478217991 | 0.010687 | 0.01974 | -0.0691 |
| 1478217992 | 0.010687 | 0.01974 | -0.0691 |
| ... | ... | ... | ... |

FIG. 3

| time | rotationRate_x | rotationRate_y | rotationRate_z |
|---|---|---|---|
| 1478217990 | 0.09362 | -0.3415 | -0.0455 |
| 1478217991 | 0.09362 | -0.3415 | -0.0455 |
| 1478217992 | 0.09362 | -0.3415 | -0.0455 |
| ... | ... | ... | ... |

FIG. 4

| time | gravity_x | gravity_y | gravity_z | userAcceleration_x | userAcceleration_y | userAcceleration_z |
|---|---|---|---|---|---|---|
| 1478217990 | 0.22016 | -0.75138 | -0.61886 | -0.01068 | 0.01974 | -0.06911 |
| 1478217991 | 0.24725 | -0.66230 | -0.69484 | -0.01036 | 0.00164 | 0.02886 |
| 1478217992 | -0.00289 | -0.62504 | -0.77211 | 0.00098 | -0.03768 | 0.00751 |
| ... | ... | ... | ... | ... | ... | ... |

FIG. 5

| time | velocity_lon | velocity_lat | acceleration_lon | acceleration_lat | curvature |
|---|---|---|---|---|---|
| 1478217990 | 0.44712 | 0.22016 | -0.75138 | -0.61886 | -0.01068 |
| 1478217991 | 0 | 0.24725 | -0.66230 | -0.69484 | -0.01036 |
| 1478217992 | 1.00601 | -0.00289 | -0.62504 | -0.77211 | 0.00098 |
| ... | ... | ... | ... | ... | ... |

FIG. 6

METHOD AND SYSTEM FOR LEAN ANGLE ESTIMATION OF MOTORCYCLES

BACKGROUND

Field

The present disclosure is generally related to motorcycle systems, and more specifically, for systems and methods to estimate the lean angle of a motorcycle.

Related Art

The monitoring of driver behavior and vehicle status can be helpful for many applications, such as alerting the driver when unusual behaviors are detected. Motorcycles and cars can differ in many ways, such as the number of wheels, the shape of the handles, and so on. For motorcycle riders in particular, one of the most differentiating aspects is how motorcycles turn on curves. Motorcycle riders turn on curves by leaning the body into the direction of the curve against the centrifugal force, which is not true for cars. The degree of lean depends on the speed, curve, the type of the motorcycle, and the skill of the rider. Hence, lean angle has been utilized as a parameter to characterize the rider behavior.

In related art implementations, lean angle is estimated through the use of specialized devices that are specifically equipped and calibrated to be placed in a specific location within a motorcycle. An example of such a related art implementation can be found in US Patent Application 2010/0168958A1.

SUMMARY

Related art implementations measure the lean angle by using a specialized device. Although such a device may be capable of recording the lean angle with high accuracy, such special devices are dedicated only to that purpose, and specific attachment to the motorcycles is required.

Mobile devices such as mobile devices may involve several sensors, such as Global Positioning Satellite (GPS), gyroscopes, and accelerometers. Applications that utilize such sensors could record the lean angle, but such applications would require that the mobile device be carefully and specifically mounted at a particular location, and need calibration to obtain accurate results.

Thus, related art implementations either utilize specialized devices or require specific calibration and placement, which limits the usability of systems that depend on these techniques. Example implementations described herein are directed to systems and methods to estimate the lean angle though mobile device sensor data which can eliminate the need for conducting calibration or requiring specific placement of the mobile device.

Example implementations involve a system for lean angle estimation without the need for calibration and while utilizing only mobile device sensor data. The system collects data recorded by sensors such as GPS, gyroscopes, and accelerometers. The system provides the functions to estimate base attitudes, absolute values of lean angle, and directions of leaning. The system represents a motorcycle attitude by a vector of gravitational acceleration relative to the frame fixed in vectors of the mobile device. The system estimates a base attitude, which represents an attitude of a motorcycle driving without leaning (e.g., going straight) based on attributes such as speed and curvature calculated from raw sensor data. Once a base attitude is built, the system compares a current attitude with the base attitude and obtains the magnitude of the lean angle by calculating the angle between two attitudes. The lean direction (e.g. right or left) is estimated from the information such as the direction of centrifugal force derived from sensor values.

Aspects of the present disclosure includes a system for estimating a lean angle of a motorcycle, the system including a memory, configured to store gravity information and driving information; and a processor, configured to determine a base attitude comprising estimated gravity values of the motorcycle when the motorcycle is determined to be in an upright position, from the gravity information and the driving information selected from one or more timestamps; determine a measured attitude from the gravity information and the driving information for a timestamp from the one or more timestamps; and, determine the lean angle of the motorcycle for the timestamp from the one or more timestamps, based on differences between the measured attitude and the base attitude for the timestamp from the one or more timestamps.

Aspects of the present disclosure includes a method for estimating a lean angle of a motorcycle, the method including storing gravity information and driving information; determining a base attitude comprising estimated gravity values of the motorcycle when the motorcycle is determined to be in an upright position, from the gravity information and the driving information selected from one or more timestamps; determining a measured attitude from the gravity information and the driving information for a timestamp from the one or more timestamps; and, determining the lean angle of the motorcycle for the timestamp from the one or more timestamps, based on differences between the measured attitude and the base attitude for the timestamp from the one or more timestamps.

Aspects of the present disclosure includes a computer program including instructions for estimating a lean angle of a motorcycle, the instructions including storing gravity information and driving information; determining a base attitude comprising estimated gravity values of the motorcycle when the motorcycle is determined to be in an upright position, from the gravity information and the driving information selected from one or more timestamps; determining a measured attitude from the gravity information and the driving information for a timestamp from the one or more timestamps; and, determining the lean angle of the motorcycle for the timestamp from the one or more timestamps, based on differences between the measured attitude and the base attitude for the timestamp from the one or more timestamps. The computer program may be stored in a non-transitory computer readable medium and configured to be executed by one or more processors.

Aspects of the present disclosure includes a system for estimating a lean angle of a motorcycle, the system including means for storing gravity information and driving information; means for determining a base attitude comprising estimated gravity values of the motorcycle when the motorcycle is determined to be in an upright position, from the gravity information and the driving information selected from one or more timestamps; means for determining a measured attitude from the gravity information and the driving information for a timestamp from the one or more timestamps; and, means for determining the lean angle of the motorcycle for the timestamp from the one or more timestamps, based on differences between the measured attitude and the base attitude for the timestamp from the one or more timestamps.

BRIEF DESCRIPTION OF DRAWINGS

FIG. 2 illustrates an example of sensor data measured by GPS, in accordance with an example implementation.

FIG. 3 shows an example of sensor data measured by an accelerometer, in accordance with an example implementation.

FIG. 4 illustrates an example of sensor data measured by gyroscope, in accordance with an example implementation.

FIG. 5 illustrates an example of processed data derived from accelerometer data, in accordance with an example implementation.

FIG. 6 illustrates an example of processed data derived from GPS data, in accordance with an example implementation.

DETAILED DESCRIPTION

Figure 1:
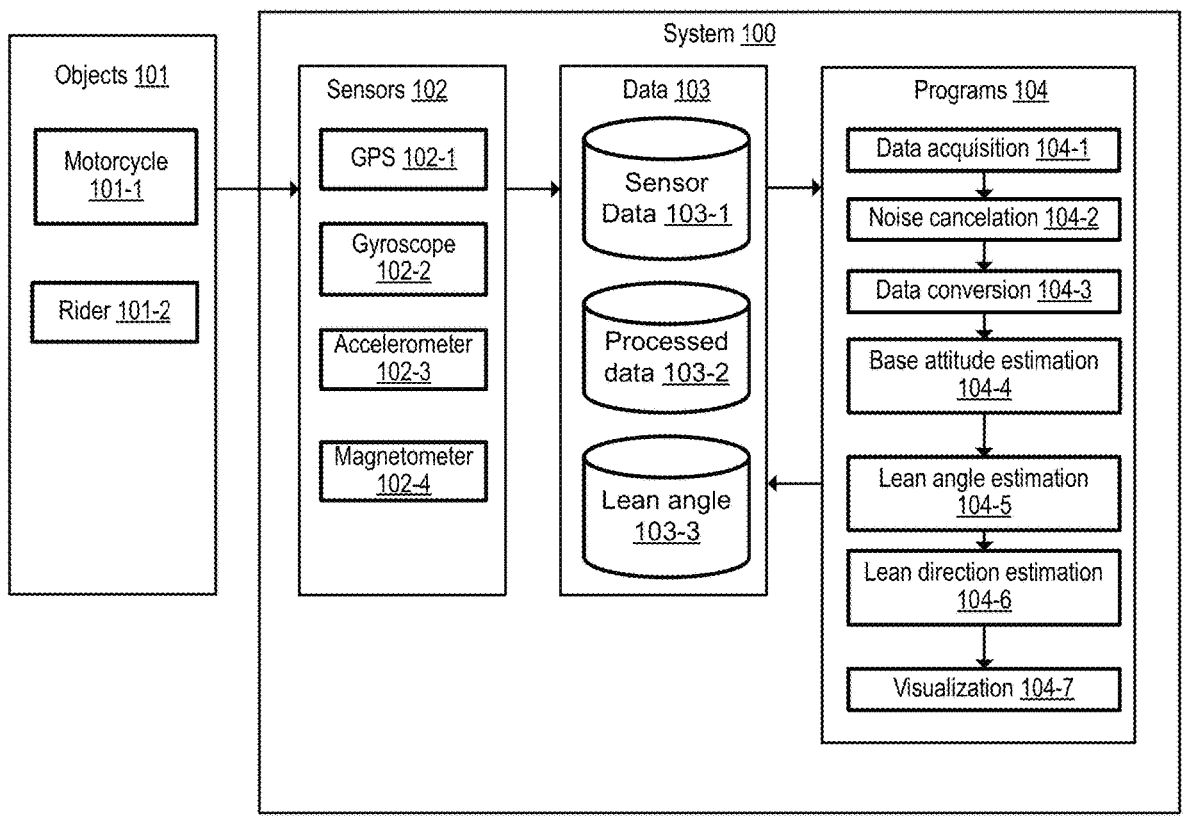
FIG. 1 illustrates an example system architecture upon which example implementations may be implemented.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an example system architecture upon which example implementations may be implemented. System 100 is configured to interact with objects 101. System 100 includes sensors 102, data 103, and programs 104. Objects 101 include the motorcycle 101-1 and the rider 101-2.

Sensors 102 are built into a mobile device which can be placed anywhere on the body of the motorcycle 101-1 or displaced near the motorcycle 101-1 such as inside a jacket pocket or pants pocket of a rider 101-2. The mobile device can include sensors 102 such as GPS 102-1, gyroscope 102-2, accelerometer 102-3, and magnetometer 102-4.

Stored data 103 can include sensor data 103-1 which stores values detected by the sensors 102 over a certain sampling rate. Processed data 103-2 stores data converted from the sensor data. Lean angle 103-3 stores the lean angle estimated from using the processed data 103-2. The system 100 also includes programs 104 to manipulate sensor data 103-1 and processed data 103-2. In example implementations, the sensors 102 are included in a mobile device. The data 103 and the programs 104 can be located either within the mobile device or on a remote management device such as a management apparatus (e.g., a server, cloud, etc.). In the latter case, the data 103 collected by the sensors 102 are sent to the management apparatus through a network.

Programs 104 can include a data acquisition process 104-1 which is configured to conduct data intake of sensor data 103-1. The sensor data 103-1 is then processed by noise cancelation 104-2 to smooth out the data and remove outliers through any noise cancellation methods in accordance with the desired implementation. The data conversion process 104-3 converts the sensor data 103-1 into processed data 103-2. The base attitude estimation process 104-4 is configured to estimate the base attitude from the processed data 103-2. The lean angle estimation process 104-5 is configured to estimate the lean angle and store as lean angle 103-3. The lean direction estimation process 104-6 is configured to estimate the lean direction based on the determined lean angle 103-3 and the processed data 103-2. Visualization 104-7 is configured to provide a desired visualization of the data 103.

FIG. 2 illustrates an example of sensor data 103-1 measured by GPS 102-1, in accordance with an example implementation. Such data can include the timestamp, the longitude, the latitude and the altitude. Other data can also be recorded by the GPS 102-1 depending on the GPS 102-1 system utilized.

FIG. 3 shows an example of sensor data 103-1 measured by an accelerometer 102-3, in accordance with an example implementation. Each component represents acceleration worked on a mobile device relative to the frame of the mobile device. Such data can include the timestamp, the acceleration in the x-axis relative to the frame of the mobile device, the acceleration in the y-axis relative to the frame of the mobile device, and the acceleration in the z-axis relative to the frame of the mobile device. Other data can also be recorded by the accelerometer 102-3 depending on the accelerometer 102-3 utilized.

FIG. 4 illustrates an example of sensor data 103-1 measured by gyroscope 102-2, in accordance with an example implementation. Each component represents the rotation rate around the axis fixed in the mobile device. Such data can include the timestamp, the rotation rate in the x-axis relative to the frame of the mobile device, the rotation rate in the y-axis relative to the frame of the mobile device, and the rotation rate in the z-axis relative to the frame of the mobile device. Other data can also be recorded by the gyroscope 102-2 depending on the gyroscope 102-2 utilized.

FIG. 5 illustrates an example of processed data 103-2 derived from the accelerometer data and the gyroscope data of the sensor data 103-1, in accordance with an example implementation. In example implementations, data conversion 104-3 converts the accelerometer data of the sensor data 103-1 as illustrated in FIG. 3 and the gyroscope data of the sensor data 103-1 as illustrated in FIG. 4, into the processed data 103-2 illustrated in FIG. 5 through any desired implementation. FIG. 5 illustrates example gravity information that is generated from data conversion 104-3. Time is indicative of the timestamp of the detected sample. gravity_x, gravity_y, and gravity_z are components of a gravity vector. The direction of the gravity vector points to the center of earth relative to the frame fixed in the mobile device. The magnitude of the gravity vector equals to the difference between the gravitational acceleration and the gravitational constant (9.8 m/s2). userAcceleration_x, userAcceleration_y, and userAcceleration_z are accelerations caused by the movement of the mobile phone along the x, y, z axes fixed in the mobile device. userAccelerations do not include the gravitational acceleration, and can be determined through any desired method for separating the gravity and acceleration caused by user movement from the raw acceleration. Both the gravity vector and the user acceleration vector can be derived from the accelerometer 102-3 through any desired implementation known in the art.

FIG. 6 illustrates an example of processed data 103-2 derived from the GPS data of the sensor data 103-1, in accordance with an example implementation. In example implementations, data conversion 104-3 converts the GPS data of the sensor data 103-1 as illustrated in FIG. 2, into the processed data 103-2 illustrated in FIG. 6 through any desired implementation. FIG. 6 illustrates example driving information that is generated from data conversion 104-3. Time is indicative of the timestamp. Velocity_lon is velocity of the mobile device along the longitude direction, which is also the velocity of the motorcycle along the longitude direction. Velocity_lat is velocity of the mobile device along the latitude direction, which is also the velocity of the motorcycle along the latitude direction. Acceleration_lon is acceleration of the mobile device along the longitude direction, which is also the acceleration of the mobile device along the longitude direction. Acceleration_lat is acceleration of the mobile device along the latitude direction, which is also the acceleration of the motorcycle along the latitude direction. Curvature describes how much the trajectory of the motorcycle is curving at a point. Velocity_lon and velocity_lat are calculated by taking derivatives of the position of the mobile device, which are derived from latitude and longitude of GPS data as illustrated in FIG. 2. Accleration_lon and acceleration_lat are calculated by taking derivatives of the velocities. Curvature is calculated from Velocity_lon, Velocity_lat, Acceleration_lon, and Acceleration_lat.

In an example implementation, curvature can be calculated in accordance with the following equation:

$$\kappa = \frac{x'y'' - y'x''}{(x'^2 + y'^2)^{3/2}}$$

where (x',y') is a velocity vector and (x',y'') is an acceleration vector.

Figure 7:
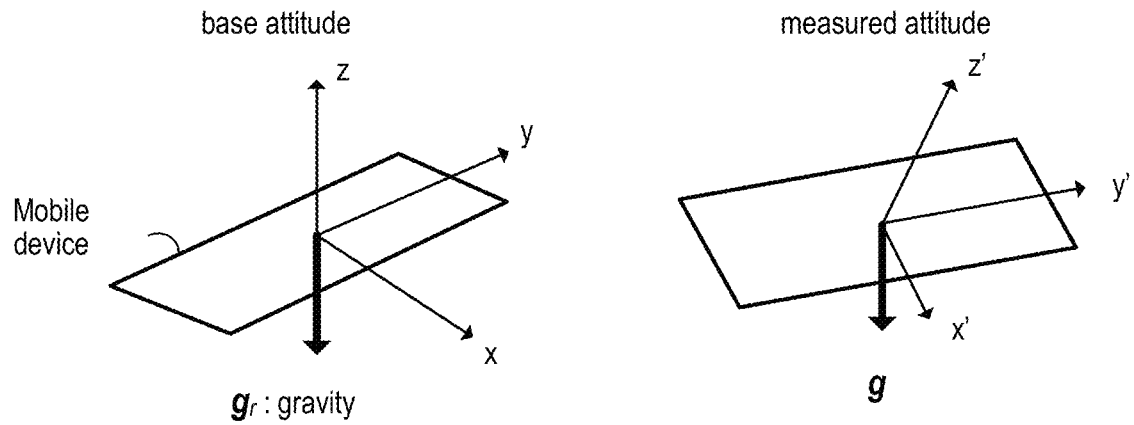
FIG. 7 illustrates example cases with different attitudes of a mobile device, in accordance with an example implementation.

FIG. 7 illustrates example cases with different attitudes of a mobile device, in accordance with an example implementation. As the body of a mobile device rotates, the frame changes from {x, y, z} to {x', y', z'}, and hence, the gravity vector changes. The base attitude is calculated from the base attitude estimation process 104-4, whereas the measured attitude is the attitude that is measured calculated as a gravity vector for each timestamp from the gravity information of FIG. 5 and the driving information of FIG. 6 based on the calculation as illustrated in FIG. 7.

Figure 8:
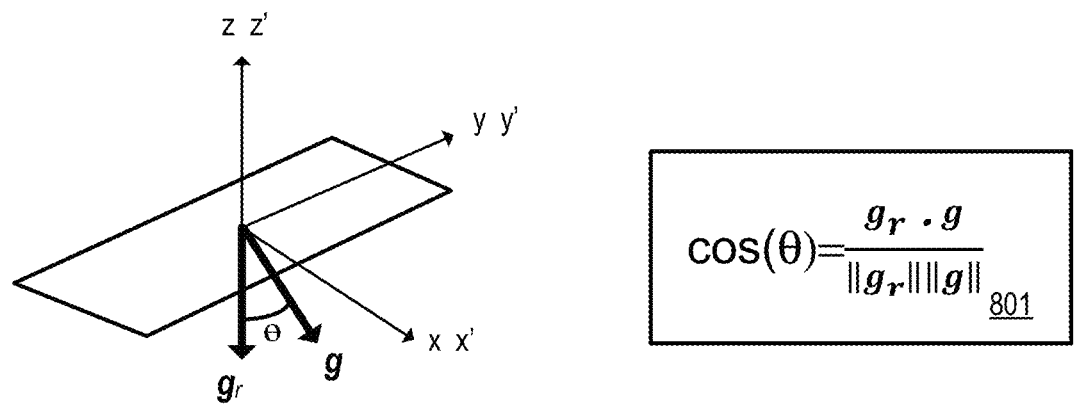
FIG. 8 illustrates an example of a calculation from the relative angle of the two attitudes, in accordance with an example implementation.

Given two attitudes, the relative angle of the two attitudes can be calculated. FIG. 8 illustrates an example of a calculation from the relative angle of the two attitudes, in accordance with an example implementation. Specifically, FIG. 8 illustrates an example execution of how the lean angle estimation 104-5 can be conducted. The inner product of two vectors and angle θ between two vectors has a relation as expressed in the equation illustrated at 801. θ can be derived from the equation given two vectors. For example, if the two attitudes are the same, θ is zero value. The more the two vectors point in different directions, the bigger θ becomes. The gravity vectors are associated with the attitude of the mobile device, such that θ represents an angle between two attitudes.

Turning back to FIG. 1, the base attitude estimation process 104-4 is utilized to generate a base attitude estimation. A base attitude is composed of the gravity components when a motorcycle is not leaning in any direction (e.g., when a motorcycle is determined to be in an upright position). The base attitude can be obtained if the mobile device can be calibrated in advance. For example, the mobile device could be attached to the body of the motorcycle and the gravity values are recorded when the body is not leaning. However, the example implementations described herein are configured to build a base attitude model without the need of calibration. Thus, example implementations establish a way to estimate the base attitude from sensor values. There can be several methods to implement the base attitude estimation process 104-4 as described below.

One method involves taking the average of the gravity values over the trip. In this method, the motorcycle is determined to be in an upright position for most of the trip and thus, the motorcycle is not leaning in most of the trip.

Another method involves extracting the period of driving with high speed and taking the average during the period. Such an example is based on the assumption that a motorcycle is determined to be in an upright position not leaning in its top speed or speed above a set speed threshold. The speed threshold utilized to determine whether the motorcycle is going at high speed can be set according to the desired implementation.

Another method involves extracting the period of straight driving (e.g, curvature measurements are within a curvature threshold of zero) from GPS information and take the average, based on the assumption that a motorcycle is upright and not leaning while going straight. The curvature threshold can be set according to the desired implementation (e.g., based on instrument error).

Another method involves extracting the period of when no g-force exists (e.g., userAcceleration measurements are within an acceleration threshold of zero) and take the average, based on the assumption that a motorcycle is upright and not leaning when going straight. The acceleration threshold can be set according to the desired implementation.

The methods described above or any combination of such methods thereof can be utilized to construct a base attitude for the base attitude estimation process 104-4.

Further, in example implementations, multiple base attitudes can be constructed instead of one base attitude over a trip, depending on the desired implementation. For example, curving periods can be identified based on the curvatures. Then, for each curving period, a gravity vector can be taken just before the curve, which is utilized as a base attitude for the following period. Base attitudes can also be recalculated based on pauses in the trip or otherwise, in accordance with the desired implementation.

Turning back to FIG. 1, the lean direction estimation process 104-6 is configured to estimate the lean direction based on the determined lean angle 103-3 and the processed data 103-2. The equation illustrated in FIG. 8 provides the magnitude of the lean angle 103-3, but does not provide the lean direction. In example implementations, the system estimates the lean direction based on processed data 103-2 as illustrated in FIGS. 5 and 6. There can be several methods to implement lean direction estimation process 104-6 as described below.

One method to estimate the lean direction is based on checking the curvature sign of the corresponding time stamp from the processed data 103-2 illustrated in FIG. 6, which indicates the direction of curving, and assigning the lean direction according to the curving direction. For example, if the motorcycle is turning right, then the assumption is that the motorcycle is leaning right. The direction of a curve can be determined based on the sign of the curvature. When the curvature takes a positive/negative value, the motorcycle is curving left/right. The definition of curvature can be extended to three-dimensional case in view of the following equation:

$$\kappa = \frac{|\vec{v} \times \vec{a}|}{|\vec{v}|^{3/2}}$$

where $\vec{v}$ represents a velocity vector and $\vec{a}$ represents acceleration vector calculated from position vector $\vec{x}$.

Another method involves decomposing the userAccelerations into the direction of the motorcycle and the direction vertical to the motorcycle direction, then checking the acceleration along the vertical direction and assigning the direction according to the direction of acceleration e.g. if the mobile device senses acceleration to right, then the motorcycle is determined to be leaning left.

Figure 9:
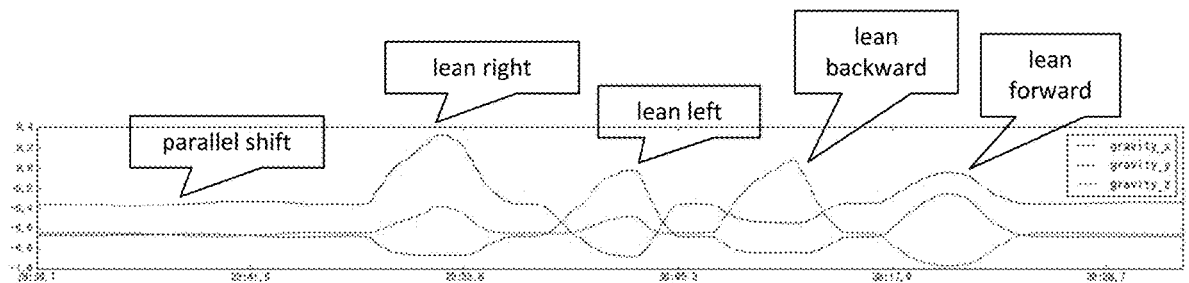
FIG. 9 illustrates an example of associations between lean direction and the components of the gravity vector, in accordance with an example implementation.

Another method involves analyzing the changes to the components of a gravity vector. The components of gravity vary as the motorcycle leans and the changes to each component (e.g., going up/down) compared with a base attitude is related to the lean direction. Therefore, the lean direction can be determined by observing the change in the components of gravity. This association could change once the mounting position of the mobile device changes. However, the association does not change as long as the mobile device is retained in the same position, whatever that position might be. FIG. 9 illustrates an example of associations between lean direction and the components of the gravity vector, in accordance with an example implementation.

Thus, example implementations can utilize one of the methods above or any combination thereof to estimate lean direction.

Decomposition of userAcceleration

Figure 10:
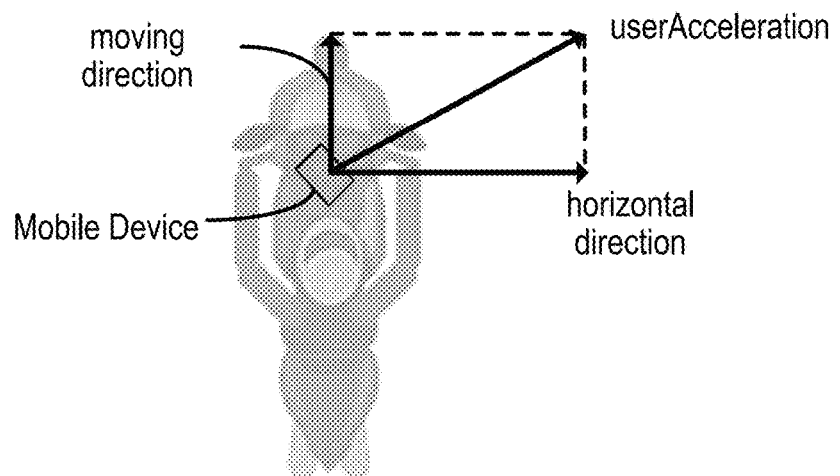
FIG. 10 illustrates an example of userAcceleration decomposed into moving and horizontal directions, in accordance with an example implementation.

FIG. 10 illustrates an example of userAcceleration decomposed into moving and horizontal directions, in accordance with an example implementation. FIG. 10 illustrates a top view of a motorcycle. Given a vector that indicates the horizontal and a vector of userAcceleration relative to the mobile device frame, the component of userAcceleration can be obtained along the vertical direction by projecting the userAcceleration vector onto the vertical direction. The direction of the centrifugal force worked on the motorcycle can be determined by checking the value of the projected vector.

Figure 11:
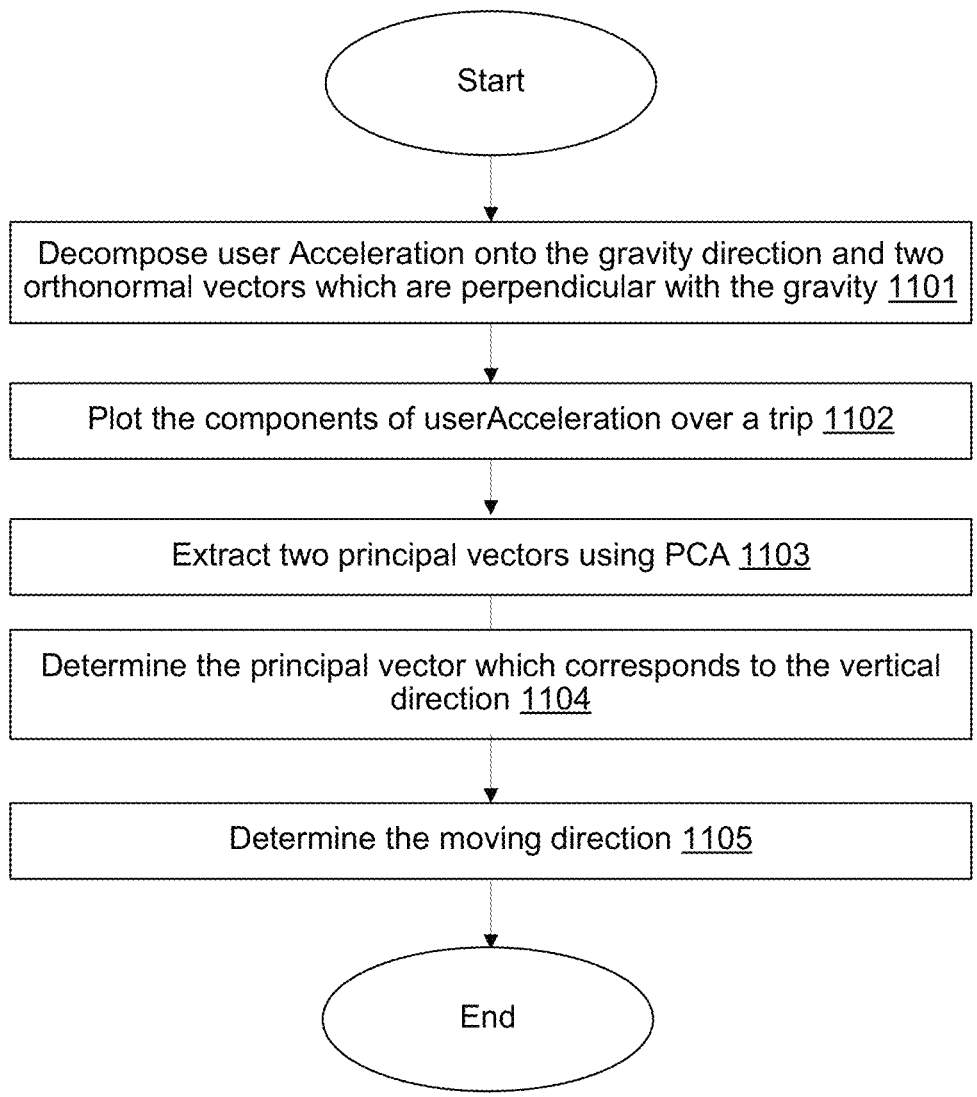
FIG. 11 illustrates an example flow for determining the moving direction of the motorcycle, in accordance with an example implementation.
Figure 12:
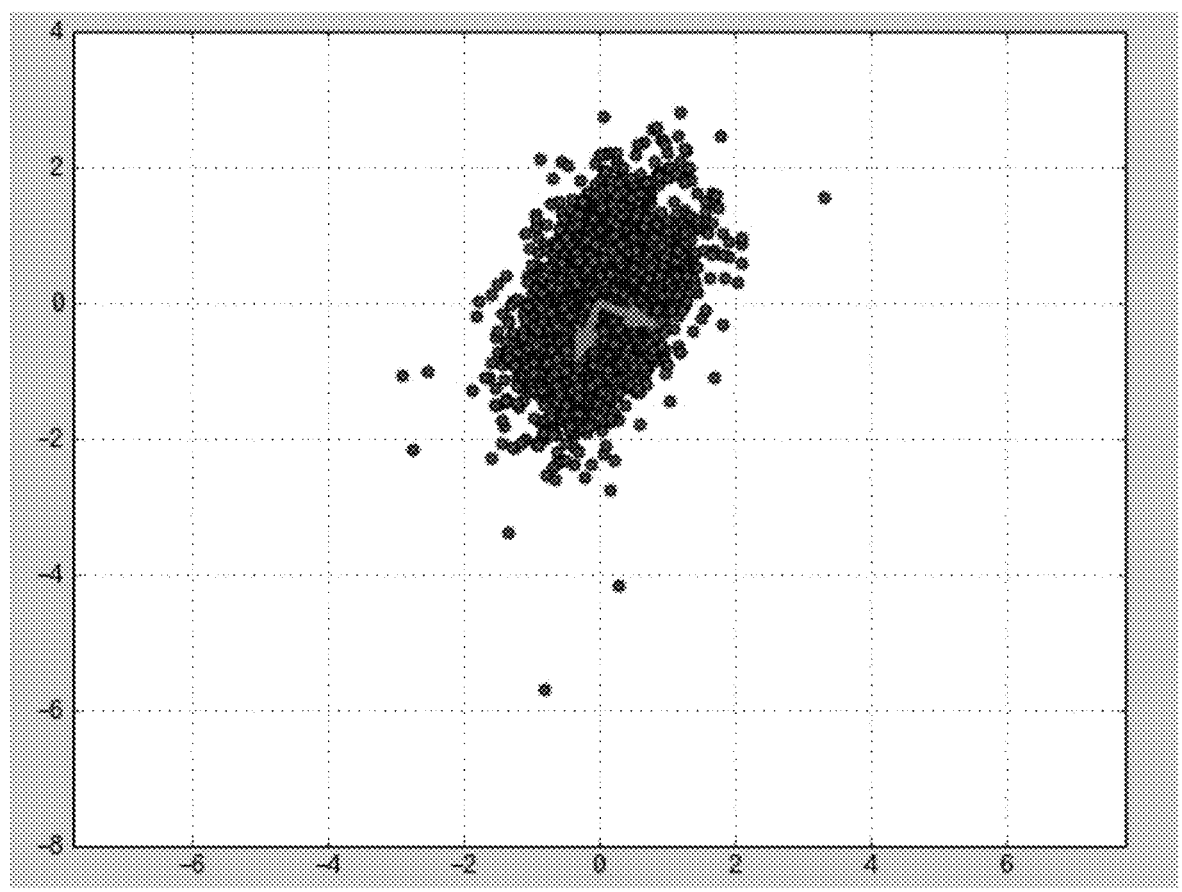
FIG. 12 illustrates an example plot of userAcceleration, in accordance with an example implementation.

The moving and horizontal directions are determined based on the symmetric property of userAcceleration as described in FIG. 11. FIG. 11 illustrates an example flow for determining the moving direction of the motorcycle, in accordance with an example implementation. At 1101, the flow begins through decomposing userAcceleration onto the gravity direction and two orthonormal vectors which are perpendicular with the gravity (Call these vectors $\vec{n}_x$ and $\vec{n}_y$). At 1102, the $\vec{n}_x$, $\vec{n}_y$ components of userAcceleration are plot over a trip. FIG. 12 illustrates an example plot of userAcceleration, in accordance with an example implementation (e.g. the execution of the flow at 1102).

At 1103, two principal vectors are extracted using PCA (Principal Component Analytics), as illustrated by the two vectors illustrated in FIG. 12. At 1104, the flow determines the principal vector which corresponds to the vertical direction. Most of the userAcceleration may be caused by vibration of the mobile device, and it is therefore reasonable to assume that vertical components have no difference between right and left directions. Therefore, the average of the vertical components over a trip is almost zero. The principal vector of the vertical direction can be selected by comparing average values for two principal vectors.

At 1105, the flow determines the moving direction. After the flow at 1104, the principal vector that is parallel to the moving direction is identified, however, the correspondences between positive/negative values and forward/backward directions are not yet known. The correspondences can be identified by comparing a userAcceleration component projected on the principal vector and the sign (+/−) of the acceleration calculated from GPS data, which indicates whether the motorcycle is accelerating or decelerating.

Figure 13:
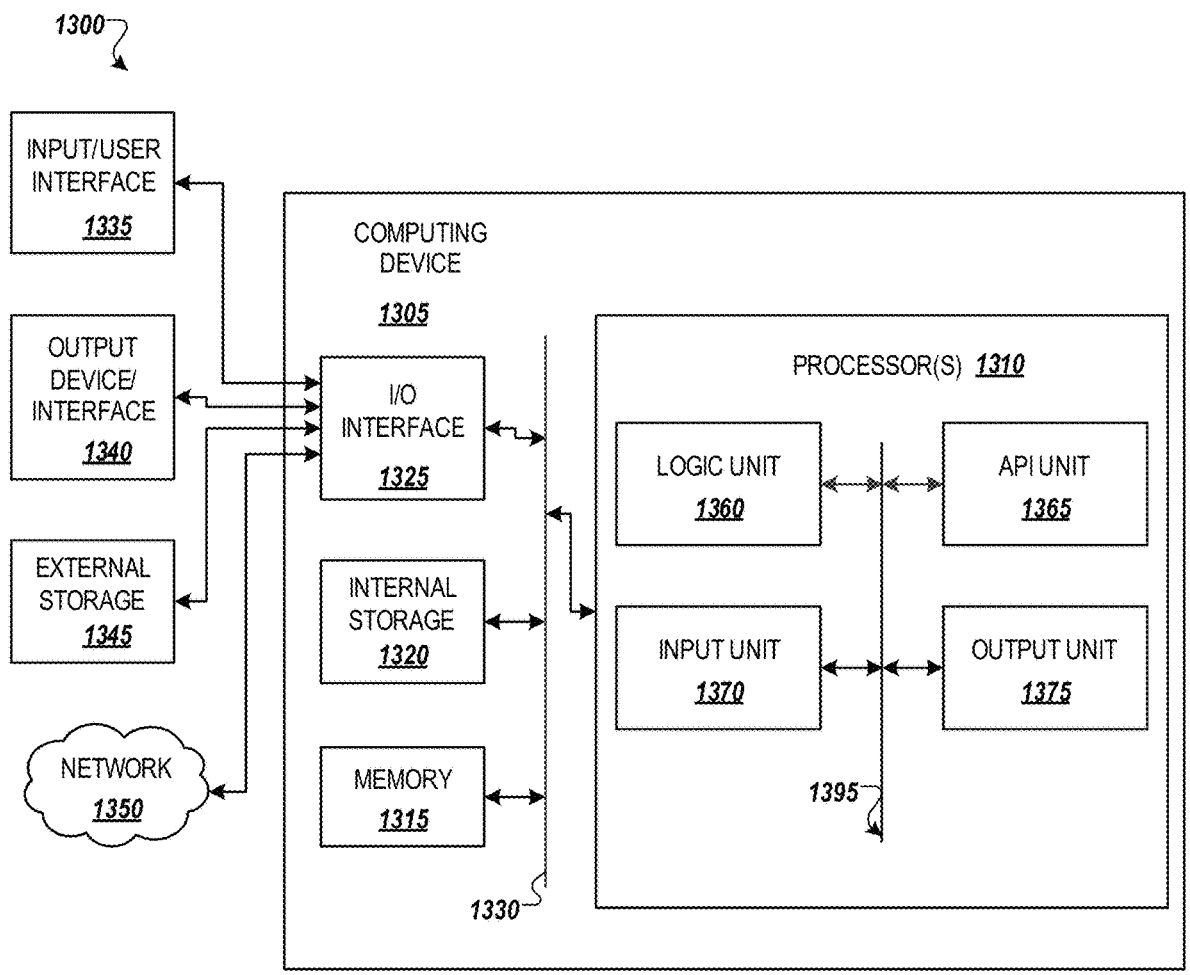
FIG. 13 illustrates an example computing environment with an example computer device suitable for use in some example implementations.

FIG. 13 illustrates an example computing environment with an example computer device suitable for use in some example implementations, such as a mobile device configured to manage sensors 102 from FIG. 1, and/or from a management apparatus configured to manage data 103 and programs 104 to facilitate the functions of system 100. Any of the elements illustrated in system 100 can be implemented in either the mobile device or the management apparatus, depending on the desired implementation. Further, any function executed by computer device 1305 can be conducted by mobile device or management apparatus, in accordance with the desired implementation.

Computer device 1305 in computing environment 1300 can include one or more processing units, cores, or processors 1310, memory 1315 (e.g., RAM, ROM, and/or the like), internal storage 1320 (e.g., magnetic, optical, solid state storage, and/or organic), and/or I/O interface 1325, any of which can be coupled on a communication mechanism or bus 1330 for communicating information or embedded in the computer device 1305. I/O interface 1325 is also configured to receive images from cameras or provide images to projectors or displays, depending on the desired implementation.

Computer device 1305 can be communicatively coupled to input/user interface 1335 and output device/interface 1340. Either one or both of input/user interface 1335 and output device/interface 1340 can be a wired or wireless interface and can be detachable. Input/user interface 1335 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1340 may include a display, television, monitor, printer, speaker, braille, or the like. In some example implementations, input/user interface 1335 and output device/interface 1340 can be embedded with or physically coupled to the computer device 1305. In other example implementations, other computer devices may function as or provide the functions of input/user interface 1335 and output device/interface 1340 for a computer device 1305.

Examples of computer device 1305 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1305 can be communicatively coupled (e.g., via I/O interface 1325) to external storage 1345 and network 1350 for communicating with any number of networked components, devices, and systems, including one or more computer devices of the same or different configuration. Computer device 1305 or any connected computer device can be functioning as, providing services of, or referred to as a server, client, thin server, general machine, special-purpose machine, or another label.

I/O interface 1325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1300. Network 1350 can be any network or combination of networks (e.g., the Internet, local area network, wide area network, a telephonic network, a cellular network, satellite network, and the like).

Computer device 1305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1305 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1310 can execute under any operating system (OS) (not shown), in a native or virtual environment. One or more applications can be deployed that include logic unit 1360, application programming interface (API) unit 1365, input unit 1370, output unit 1375, and inter-unit communication mechanism 1395 for the different units to communicate with each other, with the OS, and with other applications (not shown). The described units and elements can be varied in design, function, configuration, or implementation and are not limited to the descriptions provided.

In some example implementations, when information or an execution instruction is received by API unit 1365, it may be communicated to one or more other units (e.g., logic unit 1360, input unit 1370, output unit 1375). In some instances, logic unit 1360 may be configured to control the information flow among the units and direct the services provided by API unit 1365, input unit 1370, output unit 1375, in some example implementations described above. For example, the flow of one or more processes or implementations may be controlled by logic unit 1360 alone or in conjunction with API unit 1365. The input unit 1370 may be configured to obtain input for the calculations described in the example implementations, and the output unit 1375 may be configured to provide output based on the calculations described in example implementations.

Memory 1315 can be configured to store data 103 as illustrated in FIG. 1, which can include the sensor data 103-1, the processed data 103-2, and the lean angle 103-3. Sensor data 103-1 can include GPS data as illustrated in FIG. 2, accelerometer data as illustrated in FIG. 3, and gyroscope data as illustrated in FIG. 4. Processed data 103-2 can include the data as illustrated in the gravity information of FIG. 5 and driving information of FIG. 6. As illustrated in FIG. 5, gravity information can include gravity values along an x-axis, y-axis and z-axis, and the processor(s) 1310 can be configured to derive the gravity information from acceleration information provided by the accelerometer 102-3 as illustrated in FIG. 3 and rotational information provided by the gyroscope 102-2 as illustrated in FIG. 4, which is received from a mobile device associated with the motorcycle. As illustrated in FIG. 6, driving information can include latitude velocity of the motorcycle, longitude velocity of the motorcycle, curvature measurement of the motorcycle, latitude acceleration of the motorcycle, and longitude acceleration of the motorcycle.

Processor(s) 1310 can be configured to determine a base attitude including estimated gravity values of the motorcycle when the motorcycle is determined to be in an upright position, from the gravity information and the driving information selected from one or more timestamps through execution of base attitude estimation process 104-4 as described in FIG. 1 and throughout the present disclosure, determine a measured attitude from the gravity information and the driving information for a timestamp from the one or more timestamps as illustrated in FIG. 7; and determine the lean angle 103-3 of the motorcycle for the timestamp from the one or more timestamps, based on differences between the measured attitude and the base attitude for the timestamp from the one or more timestamps through execution of lean angle estimation process 104-5 as described in FIG. 1 and throughout the present disclosure. Processor(s) 1310 can be configured to determine that the motorcycle is in an upright position based on at least one of: a magnitude of the latitude velocity and the longitude velocity being above a velocity threshold, the curvature measurement being within a curvature threshold from zero, and a magnitude of the latitude acceleration and the longitude acceleration being within an acceleration threshold from zero as described in the present disclosure.

Processor(s) 1310 is further configured to execute visualization process 104-7 to generate a visualization of the lean angle of the motorcycle across a plurality of timestamps as illustrated, for example, in FIG. 9.

Processor(s) 1310 can also be configured execute lean direction estimation process 104-6 to determine a lean direction of the motorcycle for the timestamp from the one or more timestamps, based on at least one of: assignment of the lean directional based on a curving direction of the motorcycle at the timestamp from the one or more timestamps, an acceleration direction along a vertical direction of the motorcycle at the timestamp from the one or more timestamps, and changes to components of the estimated gravity values compared to the base attitude as described in the present disclosure with respect to lean direction estimation process 104-6.

Processor(s) 1310 can also be configured to execute base attitude estimation process 104-4 to determine the base attitude based on at least one of: an average of the estimated gravity values over a trip of the motorcycle, an average of the estimated gravity values over one or more time periods of driving when the motorcycle is driving at a speed above a speed threshold, an average of the estimated gravity values over one or more time periods of driving when the motorcycle is determined to be driving straight, and an average of the estimated gravity values when g-force is determined not to exist as in the present disclosure with respect to lean direction estimation process 104-6.

Processor(s) 1310 can also be configured to execute lean angle estimation process 104-5 to determine the lean angle 103-3 based on an equation $$\cos(\theta) = \frac{g_r \cdot g}{\|g_r\| \|g\|}$$

wherein θ is the lean angle, $g_r$ is the measured attitude, and g is the base attitude as illustrated in FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

What is claimed is:

1. A system for estimating a lean angle of a motorcycle, the system comprising:
    a mobile device carried by the motorcycle, the mobile device comprising:
        one or more sensors, configured to detect gravity information and driving information, of the mobile device, over a sampling rate;
        a memory, configured to store the gravity information and the driving information with timestamps each indicative of a time that the one or more sensors detected the gravity information and driving information; and
        a processor, configured to:
            determine a base attitude of the mobile device, the base attitude comprising estimated gravity values of the mobile device from information associated with one or more timestamps of the gravity information and the driving information corresponding to when the motorcycle is determined to be in an upright position and traveling in a straight line, wherein the processor is configured to determine the base attitude of the mobile device from an average of the estimated gravity values over one or more time periods of driving when the motorcycle is driving at a speed above a speed threshold, or an average of the estimated gravity values when g-force is determined not to exist;
            determine a measured attitude of the mobile device from the gravity information and the driving information for a timestamp from the one or more timestamps; and
            determine the lean angle of the motorcycle for the timestamp from the one or more timestamps, based on differences between the measured attitude of the mobile device and the base attitude of the mobile device for the timestamp from the one or more timestamps.

2. The system of claim 1, wherein the processor is further configured to generate a visualization of the lean angle of the motorcycle across a plurality of timestamps.

3. The system of claim 1, wherein the processor is configured to determine a lean direction of the motorcycle for the timestamp from the one or more timestamps, based on at least one of: assignment of the lean directional based on a curving direction of the motorcycle at the timestamp from the one or more timestamps, an acceleration direction along a vertical direction of the motorcycle at the timestamp from the one or more timestamps, and changes to components of the estimated gravity values compared to the base attitude.

4. The system of claim 1, wherein the driving information comprises latitude velocity of the motorcycle, longitude velocity of the motorcycle, curvature measurement of the motorcycle, latitude acceleration of the motorcycle, and longitude acceleration of the motorcycle;
  wherein the processor is configured to determine that the motorcycle is in an upright position based on at least one of: a magnitude of the latitude velocity and the longitude velocity being above a velocity threshold, the curvature measurement being within a curvature threshold from zero, and a magnitude of the latitude acceleration and the longitude acceleration being within an acceleration threshold from zero.

5. The system of claim 1, wherein the gravity information comprises gravity values along an x-axis, y-axis and z-axis, wherein the processor is configured to derive the gravity information from acceleration information and rotational information received from the mobile device associated with the motorcycle.

6. The system of claim 1, wherein the processor is configured to determine the lean angle based on an equation $$\cos(\theta) = \frac{g_r \cdot g}{\|g_r\|\|g\|}$$

wherein $\theta$ is the lean angle, $g_r$ is the measured attitude, and g is the base attitude.

7. A non-transitory computer readable storage medium, storing instructions for estimating a lean angle of a motorcycle, the instructions comprising:
  storing gravity information and driving information with timestamps each indicative of a time that one or more sensors detected the gravity information and driving information;
  determining a base attitude comprising estimated gravity values of a mobile device from information associated with one or more timestamps of the gravity information and the driving information corresponding to when the motorcycle is determined to be in an upright position and traveling in a straight line, wherein the determining the base attitude of the mobile device is from an average of the estimated gravity values over one or more time periods of driving when the motorcycle is driving at a speed above a speed threshold, or an average of the estimated gravity values when g-force is determined not to exist;
  determining a measured attitude of the mobile device from the gravity information and the driving information for a timestamp from the one or more timestamps; and
  determining the lean angle of the motorcycle for the timestamp from the one or more timestamps, based on differences between the measured attitude of the mobile device and the base attitude of the mobile device for the timestamp from the one or more timestamps,
  wherein the mobile device is carried by the motorcycle, and
  wherein the mobile device comprises the one or more sensors.

8. The non-transitory computer readable storage medium of claim 7, further comprising generating a visualization of the lean angle of the motorcycle across a plurality of timestamps.

9. The non-transitory computer readable storage medium of claim 7, wherein the determining a lean direction of the motorcycle for the timestamp from the one or more timestamps is based on at least one of: assignment of the lean directional based on a curving direction of the motorcycle at the timestamp from the one or more timestamps, an acceleration direction along a vertical direction of the motorcycle at the timestamp from the one or more timestamps, and changes to components of the estimated gravity values compared to the base attitude.

10. The non-transitory computer readable storage medium of claim 7, wherein the driving information comprises latitude velocity of the motorcycle, longitude velocity of the motorcycle, curvature measurement of the motorcycle, latitude acceleration of the motorcycle, and longitude acceleration of the motorcycle;
  wherein the determining that the motorcycle is in an upright position is based on at least one of: a magnitude of the latitude velocity and the longitude velocity being above a velocity threshold, the curvature measurement being within a curvature threshold from zero, and a magnitude of the latitude acceleration and the longitude acceleration being within an acceleration threshold from zero.

11. The non-transitory computer readable storage medium of claim 7, wherein the gravity information comprises gravity values along an x-axis, y-axis and z-axis, wherein the deriving the gravity information from acceleration information and rotational information received from the mobile device associated with the motorcycle.

12. The non-transitory computer readable storage medium of claim 7, wherein the determining the lean angle based on an equation $$\cos(\theta) = \frac{g_r \cdot g}{\|g_r\|\|g\|}$$

wherein $\theta$ is the lean angle, $g_r$ is the measured attitude, and g is the base attitude.

13. A method for estimating a lean angle of a motorcycle, the method comprising:
  detecting, by one or more sensors included in a mobile device carried by the motorcycle, gravity information and driving information over a sampling rate;
  storing, to a memory of the mobile device, gravity information and driving information with timestamps each indicative of a time that the one or more sensors detected the gravity information and driving information;
  determining a base attitude comprising estimated gravity values of the mobile device from information associated with one or more timestamps of the gravity information and the driving information corresponding to when the motorcycle is determined to be in an upright position and traveling in a straight line, wherein the determining the base attitude of the mobile device is from an average of the estimated gravity values over one or more time periods of driving when the motorcycle is driving at a speed above a speed threshold, or an average of the estimated gravity values when g-force is determined not to exist;
  determining a measured attitude of the mobile device from the gravity information and the driving information for a timestamp from the one or more timestamps; and
  determining the lean angle of the motorcycle for the timestamp from the one or more timestamps, based on differences between the measured attitude of the mobile device and the base attitude of the mobile device for the timestamp from the one or more timestamps.

* * * * *